E. J. BREWSTER.
MECHANISM FOR HOLDING TIRES OF LOCOMOTIVE DRIVING WHEELS, &c.
APPLICATION FILED MAR. 24, 1913.
1,145,182.
Patented July 6, 1915.
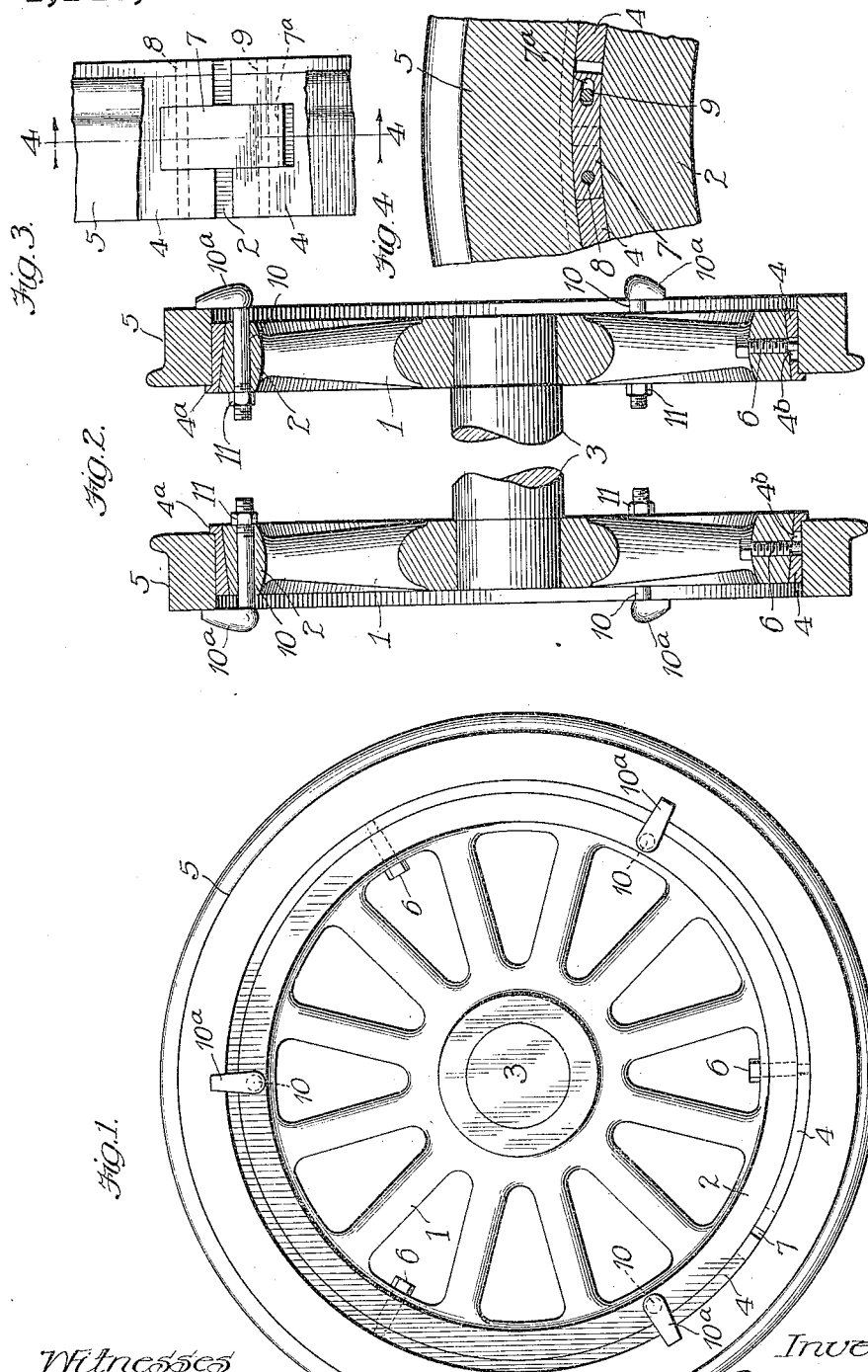
Witnesses
Martin H. Olsen.
Robert Dobberman
Inventor
Elmer J. Brewster
By Rector, Hibben, Davis & Macauley
His Atty's.
COLUMBIA PLANOGRAPH CO., WASHINGTON, D. C.

UNITED STATES PATENT OFFICE.

ELMER J. BREWSTER, OF CHICAGO, ILLINOIS, ASSIGNOR OF ONE-HALF TO JOHN MURRIN, OF CHICAGO, ILLINOIS.

MECHANISM FOR HOLDING TIRES OF LOCOMOTIVE DRIVING-WHEELS, &c.

1,145,182.

Specification of Letters Patent.

Patented July 6, 1915.

Application filed March 24, 1913. Serial No. 756,313.

*To all whom it may concern:*

Be it known that I, ELMER J. BREWSTER, a citizen of the United States, residing at Chicago, in the county of Cook and State of Illinois, have invented a certain new and useful Mechanism for Holding Tires of Locomotive Driving-Wheels, &c., of which the following is a specification.

My invention comprises mechanism used for the purpose of holding tires or rings of any kind when the same are to be turned or trued up in a machine and while my mechanism is intended primarily for holding the tires of wheels such as locomotive driving wheels, truck wheels or car wheels generally yet the same may be used for other purposes.

Heretofore in the operation of turning or truing up the tire of a locomotive driving wheel for instance, it has been necessary to heat the same to remove it from the wheel, then to reheat it in the act of placing it upon a mandrel, after which it is necessary to repeat the same operation, first to remove the tire from the mandrel after being turned or trued up and second to apply it to the driving wheel. These operations are expensive and consume considerable time.

The object of my invention is to provide a simple and easily operable mechanism for holding the tires after they have been removed from the wheel with the result that no heatings are required to either apply the tire to the mandrel or to remove it therefrom thereby avoiding the unnecessary reheatings referred to.

Speaking in general terms, my mechanism comprises one or more mandrels either connected by a central shaft or separate, if desired, and having an inclined periphery, and a split ring provided with an interior face complementary to the mandrel periphery, together with clamping bolts adapted to engage the tire and to cause a clamping and wedging action between the mandrel periphery and the tire, with the result that the tire is as firmly held upon the mandrel as when shrunk according to the old method of operation.

In the drawings, Figure 1 is a side elevation of my mechanism with a tire in place thereupon; Fig. 2 a central sectional elevation thereof illustrating two mandrels and associate parts connected by a central shaft; Fig. 3 a detail view of the split end of the ring or collar and Fig. 4 a section on the line 4—4 of Fig. 3.

In the present instance I have shown a pair of similar mandrels connected by a central shaft so that two tires may be operated upon in duplicate but it will be understood that my invention is not limited thereto as obviously the same may be embodied in a single mandrel and associate parts.

Referring to the present embodiment of my invention, I provide a mandrel 1 which is in the form of a wheel provided with a rim 2, such rim being inclined or tapered on its outer face or periphery. As above stated, I have illustrated a pair of these mandrels which are connected by a central shaft 3, the two mandrels being opposed to each other, that is, with their peripheries tapered or inclined in opposite directions as clearly indicated in Fig. 2.

Upon the periphery of the mandrel I mount a ring or collar 4 which is shown split in one place although it might, if desired, be split in more than one place. This ring, on its inner face, has a taper or inclination corresponding or complementary to the mandrel periphery so that the ring may provide the necessary wedging action when operated as hereinafter described. One edge of the ring is provided with an outwardly-extending peripheral flange $4^a$ forming a shoulder against which the tire 5 may abut as shown in Fig. 2. In order to hold the ring on to the mandrel while being handled without any work, such as the tire, in place, I provide a series of screws 6 screwing through the rim of the mandrel each having a plain end which engages in a hole $4^b$ in the ring or collar 4, Figs. 1 and 2, such hole being in the form of a slot to allow for the movement of the ring in the expanding operation.

As stated the ring 4 is split and in order to keep the ends of the ring in alinement at the place of split I provide a connecting plate 7 which is inset in both ends of the ring as clearly indicated in Fig. 3. This plate is pivotally secured to one end of the ring by means of a transverse pin 8, there being no movement between these parts except the pivotal movement but in respect to the other end of the plate a relative longitudinal movement is provided for between such plate and its end of the ring. Consequently the ring has a slot $7^a$ through which and through the ring there passes a transverse pin 9.

The means for clamping the parts together and for obtaining the wedging action comprise in the present instance a series of bolts 10 which are here three in number and which pass through the ring of the mandrel, the same being provided with an elongated head 10ª which when in radial position with respect to the mandrel engages the outer side face of the tire 5 as clearly shown in Figs. 1 and 2. The other ends of the bolts are provided with nuts 11 which when tightened cause the heads 10ª to bear against the tire as described.

In practice the bolt-heads having been turned inwardly out of the way and the ring 4ª having been moved with respect to the mandrel to its position of smallest diameter, the tire is now placed upon such ring and the bolt-heads 10ª are turned to a position to engage the outer faces of the tire. The nuts 11 are now tightened up and after the tire abuts the flange 4ª of the ring, it will force such ring to move with respect to the mandrel and owing to the complementary inclined surfaces presented by the mandrel and ring respectively the ring will be expanded and consequently the tire will be firmly and rigidly held on to the mandrel. The tire and mandrel are now ready to be operated upon in the usual machine for turning or truing up the same. When this latter work is done the reverse operations take place, that is, the nuts 11 are loosened, the heads 10ª are turned and the ring 4 permitted to contract so that the tire may be readily removed.

I claim:

1. In mechanism of the class described, the combination of a mandrel, a single split expanding ring mounted upon the periphery thereof, and means permanently mounted on the ring for loosely connecting the ends thereof.

2. In mechanism of the class described, the combination of a mandrel, a single split expanding ring mounted upon the periphery thereof, said periphery and inner face of the ring having complementary inclined surfaces, and means permanently mounted on the ring for loosely connecting the ends thereof.

3. In mechanism of the class described, the combination of a mandrel, and an expanding ring mounted upon the periphery thereof, said ring having a peripheral flange against which the work such as a tire abuts.

4. In mechanism of the class described, the combination of a mandrel, an expanding ring mounted upon the periphery thereof and having a peripheral flange, and means for actuating the ring to cause the latter to expand and thereby hold the work upon the mandrel.

5. In mechanism of the class described, the combination of a mandrel, an expanding ring mounted upon the periphery thereof, and a series of clamping bolts for actuating the ring to cause the latter to expand and thereby hold the work upon the mandrel, said bolts passing through the ring and engaging at one end one side of the ring and at the other end one edge of the work.

6. In mechanism of the class described, the combination of a mandrel, an expanding ring mounted upon the periphery thereof and having a peripheral flange to engage the work, and a series of clamp bolts having enlarged heads for engaging the work placed upon the ring and thereby causing the latter to expand.

7. In mechanism of the class described, the combination of a mandrel, an expanding ring mounted upon the periphery thereof, and interlocking means between the mandrel and ring for detachably holding the same together at all times.

8. In mechanism of the class described, the combination of a mandrel, an expanding ring mounted upon the periphery thereof, and means for detachably holding the same thereupon comprising a series of bolts projecting from the mandrel and the ring having slots to receive the outer ends thereof.

9. In mechanism of the class described, the combination of a mandrel, a split ring mounted upon the periphery thereof, and a plate pivoted to one end of the ring on a fixed axis and having a loose pivotal connection with the other end of the ring.

10. In mechanism of the class described, the combination of a mandrel, a single split ring mounted upon the periphery thereof, and means holding the free ends of the ring in alinement comprising a plate permanently connecting said ends and inset therein, said plate being arranged to permit expansion of the ring.

11. In mechanism of the class described, the combination of a mandrel, a split ring mounted upon the periphery thereof, and means holding the free ends of the ring in alinement, comprising a plate pinned to one end and having a pin and slot connection with the other end of the ring.

ELMER J. BREWSTER.

Witnesses:
 LOUIS B. ERWIN,
 ROBERT DOBBERMAN.

Copies of this patent may be obtained for five cents each, by addressing the "Commissioner of Patents, Washington, D. C."